US009359959B2

(12) United States Patent
Cuevas et al.

(10) Patent No.: US 9,359,959 B2
(45) Date of Patent: Jun. 7, 2016

(54) ANTI-ICING SYSTEM FOR A GAS TURBINE

(71) Applicant: General Electric Company, Schenectady, NY (US)

(72) Inventors: Jose Antonio Cuevas, Querétaro (MX); Tho Nguyen, Houston, TX (US); Horacio Solis, Querétaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 356 days.

(21) Appl. No.: 13/956,201

(22) Filed: Jul. 31, 2013

(65) Prior Publication Data
US 2015/0033698 A1 Feb. 5, 2015

(51) Int. Cl.
F02C 7/30 (2006.01)
F02C 7/047 (2006.01)
F01D 25/02 (2006.01)
F01D 25/00 (2006.01)

(52) U.S. Cl.
CPC ................ *F02C 7/30* (2013.01); *F01D 25/002* (2013.01); *F01D 25/02* (2013.01); *Y02E 20/16* (2013.01); *Y02E 20/18* (2013.01)

(58) Field of Classification Search
CPC ........ F02C 7/047; B64D 15/00; B64D 15/06; B64D 15/08; B64D 15/10; B64D 2033/0233; F01D 25/02; F01D 25/002; B64F 5/0063; B64F 5/0054; B64F 5/0018
See application file for complete search history.

(56) References Cited

U.S. PATENT DOCUMENTS 3,243,123 A    3/1966  Inghram et al.
4,842,005 A *  6/1989  Hope ..................... B64F 5/0054
                                              137/101.19
5,104,068 A *  4/1992  Krilla .................... B64F 5/0054
                                              134/123
5,454,533 A * 10/1995  Grant .................... B64F 5/0018
                                              244/134 C
7,875,203 B2   1/2011  Seiler et al.
7,909,261 B2   3/2011  Ellstrom et al.
2002/0179773 A1* 12/2002  Breer ..................... B64D 15/04
                                              244/134 R
2008/0149141 A1*  6/2008  Sales ..................... F01D 25/002
                                              134/22.1
2012/0153214 A1   6/2012  Boluk et al.

FOREIGN PATENT DOCUMENTS

EP    1225307 A2    7/2002
EP    1903188 A2    3/2008
JP    2001173459 A  6/2001
WO    2013017854 A1 2/2013

OTHER PUBLICATIONS

European Search Report and Opinion issued in connection with corresponding EP Application No. 14177993.4-1607 on Oct. 9, 2014.

* cited by examiner

*Primary Examiner* — Andrew Nguyen
(74) *Attorney, Agent, or Firm* — Fletcher Yoder, P.C.

(57) ABSTRACT

A system includes a gas turbine system that has a turbine, a combustor, and a compressor having an air intake. The air intake is configured to supply an air flow to the compressor. The system also includes a fluid injection system that has a fluid wash system configured to inject a wash fluid into the gas turbine system via the air intake. The fluid wash system includes an injector configured to inject the wash fluid into the gas turbine system and an anti-icing system configured to inject an anti-icing fluid into the gas turbine system via the air intake. The anti-icing system is configured to inject the anti-icing fluid into the gas turbine system via the injector.

15 Claims, 3 Drawing Sheets ized gasification combined cycle (IGCC) power plant, or single or combined cycle industrial power plant. However, the gas turbine generators also may be used in mobile units, such as large trailers. Trailer-mounted gas turbines are designed to be a mobile and quick source of electric power and thus may operate under more extreme conditions than typical IGCC, or industrial installed gas turbines. For example, a trailer-mounted gas turbine may be employed in a power grid that has failed due to an extreme natural phenomenon or grid blackout. In addition, trailer-mounted gas turbines may operate under conditions that involve a lack of protective infrastructure, cold weather, and/or high relative humidity. Unfortunately, the intake systems of the gas turbine generators may develop ice buildup when they operate in environments with certain combinations of gas turbine loads, low ambient temperatures, and high relative humidity ranges.

ANTI-ICING SYSTEM FOR A GAS TURBINE

BACKGROUND

The subject matter disclosed herein relates to anti-icing systems for gas turbine engines.

Gas turbine engines are often used to produce electricity for a power grid. The gas turbine generators are typically stationary units disposed in a power plant, such as an integrated gasification combined cycle (IGCC) power plant, or single or combined cycle industrial power plant. However, the gas turbine generators also may be used in mobile units, such as large trailers. Trailer-mounted gas turbines are designed to be a mobile and quick source of electric power and thus may operate under more extreme conditions than typical IGCC, or industrial installed gas turbines. For example, a trailer-mounted gas turbine may be employed in a power grid that has failed due to an extreme natural phenomenon or grid blackout. In addition, trailer-mounted gas turbines may operate under conditions that involve a lack of protective infrastructure, cold weather, and/or high relative humidity. Unfortunately, the intake systems of the gas turbine generators may develop ice buildup when they operate in environments with certain combinations of gas turbine loads, low ambient temperatures, and high relative humidity ranges.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a gas turbine system that has a turbine, a combustor, and a compressor having an air intake. The air intake is configured to supply an air flow to the compressor. The system also includes a fluid injection system that has a fluid wash system configured to inject a wash fluid into the gas turbine system via the air intake. The fluid wash system includes an injector configured to inject the wash fluid into the gas turbine system and an anti-icing system configured to inject an anti-icing fluid into the gas turbine system via the air intake. The anti-icing system is configured to inject the anti-icing fluid into the gas turbine system via the injector.

In accordance with a second embodiment, a system includes a fluid injection system for a gas turbine system of a mobile power unit that has a fluid wash system configured to inject a wash fluid into the gas turbine system via an air intake of a compressor. The fluid wash system includes an injector configured to inject the wash fluid into the gas turbine system. The fluid injection system also includes an anti-icing system configured to inject an anti-icing fluid into the gas turbine system via the air intake. The anti-icing system is configured to inject the anti-icing fluid into the gas turbine system via the injector.

In accordance with a third embodiment, a system includes a controller for a fluid injection system for a gas turbine system that has a turbine wash logic configured to activate a fluid wash system configured to inject a wash fluid into the gas turbine system via the air intake. The fluid wash system includes an injector configured to inject the wash fluid into the gas turbine system. The controller also includes a turbine anti-icing logic configured to activate an anti-icing system configured to inject an anti-icing fluid into the gas turbine system via the air intake. The anti-icing system is configured to inject the anti-icing fluid into the gas turbine system via the injector.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems for removing, reducing, and/or blocking the buildup of ice within gas turbine systems, such as trailer-mounted gas turbine engines. Trailer-mounted gas turbine engines may be employed in emergency situations where minimal infrastructure, mobility, and quick installation are a priority. Some emergency situations may include operation under cold and/or high relative humidity conditions that may cause ice to buildup in the interior of an intake for a gas turbine engine. In order to avoid the buildup of ice within the gas turbine engine, a gas turbine system may include an anti-icing system to spray a fluid around certain locations within the gas turbine system. The anti-icing system may be used in combination with a fluid wash system that sprays water and/or water and detergent solutions into the gas turbine system instead of anti-icing fluid. In particular, during operation, the anti-icing system may utilize hardware of the fluid wash system. In the disclosed embodiments, the anti-icing system may function in conjunction with a controller to both monitor the conditions within the gas turbine system, and control the flow of the anti-icing fluid.

Figure 1:
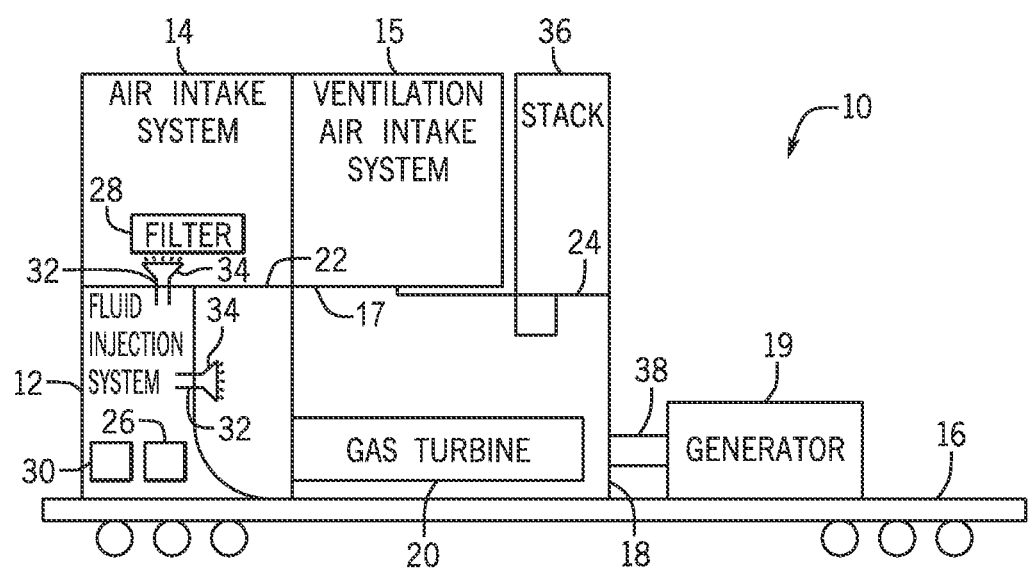
FIG. 1 is a schematic side view of an embodiment of a gas turbine generator (e.g., mobile power unit) having a fluid injection system.

FIG. 1 is a schematic side view of an embodiment of a gas turbine power generation unit 10 (e.g., gas turbine system) having a fluid injection system 12 for an air intake system 14. The fluid injection system 12, in various embodiments, has applicability for any gas turbine, including both stationary and mobile gas turbine power generation units. As illustrated, the power generation unit 10 includes a mobile gas turbine power generation unit. The power generation unit 10 includes a trailer 16, a gas turbine enclosure 18 that houses a gas turbine engine 20 on the trailer 16, and an electrical generator 19 driven by the gas turbine engine 20 on the trailer 16. The gas turbine enclosure 18 defines a ventilation intake port 17 (e.g., air intake port or turbine air intake) that takes ventilation air from a ventilation air intake system 15. The enclosure 18 also includes a ventilation air exit port 24 that cooperates with the ventilation air intake system 15 to control external cooling of the gas turbine 20. The air intake system 14 includes one or more filters 28 to filter air provided to the gas turbine engine 20. The gas turbine engine 20 includes an intake port 22 connecting the air intake system 14 to the gas turbine engine 20. Furthermore, the gas turbine engine 20 may compress the air from intake port 22 in one or more compressor stages of a compressor section, mix the air with fuel and combust the air-fuel mixture in one or more combustors of a combustion section, and drive one or more turbines of a turbine section with hot combustion products from the combustion section. The exit port 24 is coupled to an exhaust stack 36 for venting exhaust gases from the gas turbine 20 and air from the enclosure 18. The gas turbine 20 includes a drive shaft 38 that extends through the enclosure 18 and couples to the generator 19.

As discussed in detail below, the fluid injection system 12 may be coupled to the gas turbine 20 near the intake port 22. The fluid injection system 12 includes one or more pumps 30 to inject fluid (e.g., anti-icing fluid and/or wash fluid) to the intake port 22 of the gas turbine 20. The fluid injection system 12 may provide fluid into the intake port 22 and/or the air intake system 14 via one or more connecting hoses 32 and one or more injectors 34. Anti-icing fluid may contain a number of chemical solutions such as isopropyl alcohol, monopropylene glycol, acetone, water, or any combination thereof. Wash fluid may include water and/or a number of chemical detergents as well. The fluid injection system 12 may include multiple tanks 26 with different solutions in each. For example, one tank 26 may include a solution of approximately 15-25 percent monopropylene glycol and approximately 75-85 percent water while a second tank 26 includes a solution of approximately 5-15 percent monopropylene glycol and approximately 85-95 percent water. Other tanks might hold solutions of other chemicals for anti-icing and/or washing. Fluid from the tanks 26 may also be combined before being injected into the gas turbine 20. For example, an additional tank may include only water, such that a controller (described below with respect to FIG. 3) of the fluid injection system 12 may combine the water with fluid from another tank 26 to dilute that fluid.

Stationary and mobile gas turbine power generation units 10 are generally maintained to operate with a minimal amount of ice buildup within the intake and/or interior of the turbine 20. Stationary gas turbine power generation units 10 may be located within a power plant, while mobile gas turbine power generation units 10 may be located at locations subject to natural disasters, brownouts, blackouts, or other power outages. Regardless of the locale, in order to avoid the buildup of ice in the intake and/or interior of the gas turbine engines 20, the gas turbine generators 10 may use anti-icing systems to block and remove ice from the intake and/or interior of the gas turbine engines 20. The disclosed embodiment enable application of 1, 2, 3, 4, 5, or more different anti-icing fluids and/or wash fluids without requiring heaters, recirculation systems, and other equipment. The disclosed embodiment may apply the fluid using gravity fed tanks and/or spray components to simplify the fluid injection system 12. For example, the tanks 26 may be gravity fed tanks, pump driven tanks, pressurized tanks, or any combination thereof. The disclosed embodiments of fluid injection systems 12 include the tank 26 to enable anti-icing fluid to be sprayed into the gas turbine engine 20 to block or remove ice. The tank 26 may include an actuator (e.g., a drive or biasing element) coupled to a valve or damper (e.g., a plate, one or more doors, or a louver) to control fluid flow through the tank 26. An injector 34 directs the fluid flow (from the tank 26 and/or connecting hose 32) through to the intake 22. The injector 34 may include one or more spray nozzles, which may generate a conical spray, a flat spray, a sheet of fluid, multiple discrete sprays of fluid or any combination thereof. In particular, the injector 34 enables a uniform distribution of the anti-icing fluid over the turbine components, because the injector 34 creates a uniform and even spray pattern. The injector 34 may be disposed in multiple locations as described below. This makes it possible to remove dirt, debris, and buildup of ice and dust, as well as block the buildup of ice at multiple stages within the gas turbine engine 20. As a result, it is likely that the gas turbine engine 20 may start quickly and continue operating without requiring frequent delay to rearrange the anti-icing equipment.

Figure 2:
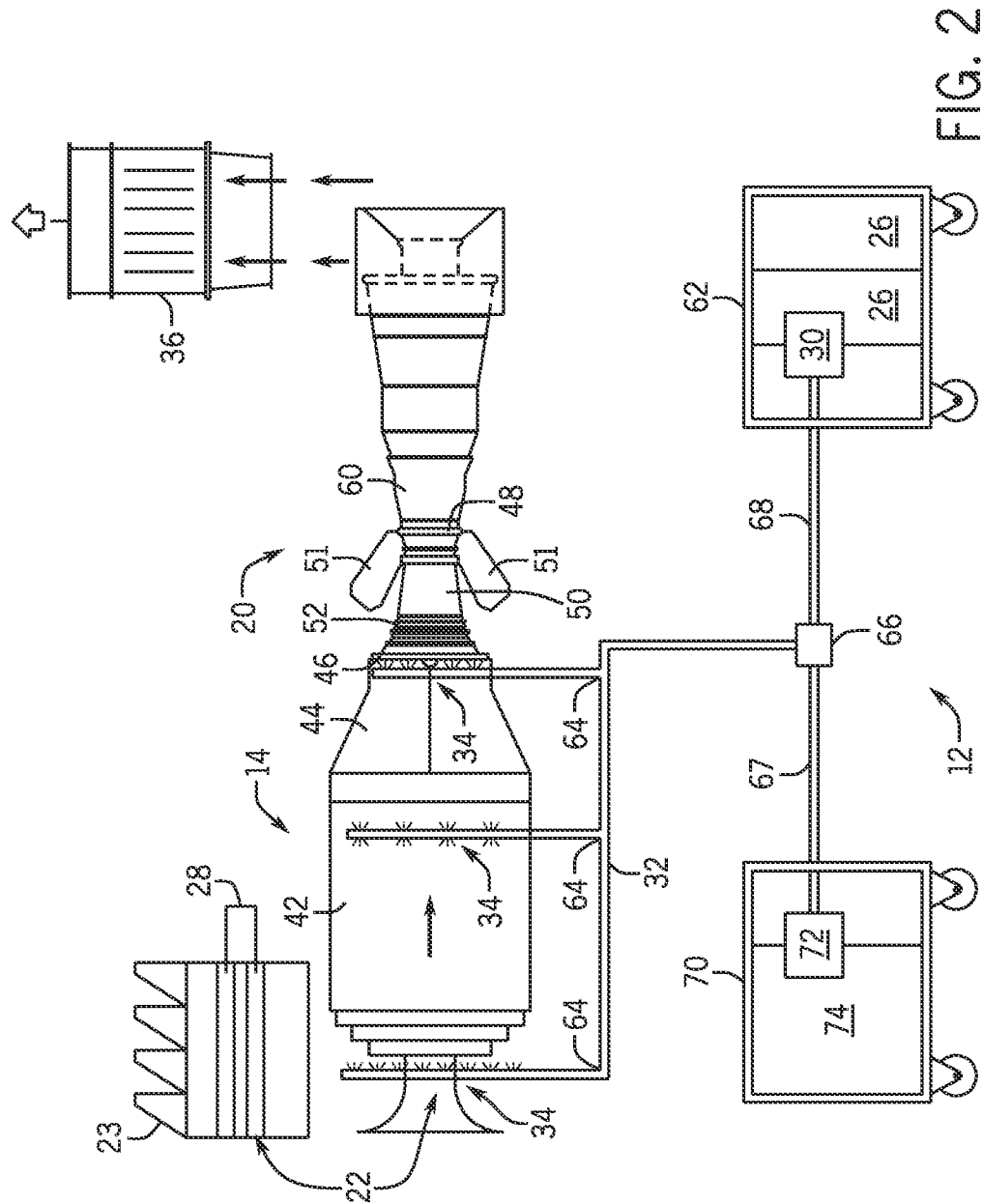
FIG. 2 is a schematic top view diagram of an embodiment of the gas turbine generator and a schematic side view of an embodiment of the fluid injection system coupled to the gas turbine generator.

FIG. 2 is a schematic top view diagram of an embodiment of a gas turbine generator and a schematic side view of an embodiment of the fluid injection system 12. The gas turbine engine 20 has an intake 22, a compressor 50 (e.g., one or more stages), one or more combustor 51, a power turbine 60 (e.g., one or more stages), and an exhaust stack 36. A large amount of air is supplied to the gas turbine engine 20 by the air intake 22. The gas turbine engine 20 compresses the air in the compressor 50, combusts a fuel with the air in the combustors 51 to generate hot combustion gases, and then drives the turbine 60 with the combustion gases. The intake 22 includes several sections that clean the air and deliver it to the compressor 50. The sections include: a plenum chamber 42, a bellmouth 44, struts 46, and inlet guide vanes (IGVs) 48. The weather hood 23 and the filters 28 provide a first barrier to the cold weather elements that may form ice within the gas turbine engine 20.

As a first barrier, the weather hood 23 and the filters 28 primarily block precipitate icing, dust, and debris from entering through the intake 22. Precipitate icing is water either in the form of liquid or solid that is present in the atmosphere. For example, precipitate icing includes hail, ice crystals, snow, freezing rain, ice fog and super cooled water droplets. Most forms of precipitate icing may be filtered out through the use of the weather hood 23 and the filters 28. Condensate icing, on the other hand, does not exist as an atmospheric condition and thus may not be blocked by the weather hood 23 or the filters 28. Condensate icing results when the air received within the intake 22 accelerates, changing velocity and pressure. Condensate icing includes hoarfrost, rime ice and glaze ice, which vary by severity and hardness. Condensate icing has a particularly strong possibility of forming on the filters 28, bellmouth 44, struts 46, inlet guide vanes (IGV) 48, and a first stage 52 of the compressor 50. Thus, injectors 34 may be placed at multiple locations along the intake 22 of the gas turbine engine 20 to block condensate icing from forming and/or remove it before operating the gas turbine engine 20. As illustrated, the injectors 34 may be placed adjacent the weather hood 23, inside the plenum chamber 42, and in front of the bellmouth 44. The injectors 34 may include multiple injectors 34 at a single location as well. For example, the injectors 34 at the front of the bellmouth 44 may include a ring of injectors 34 around the periphery of bellmouth 44. The configuration of multiple injectors 34 in multiple locations may enable the fluid injection system 12 to use less anti-icing fluid, as the fluid may be sprayed more directly at each of the areas.

As illustrated, the fluid injection system 12 may include a first cart 62 that is separated from the trailer 16 and contains the tank 26 and the pump 30. As described above, multiple tanks 26 and/or multiple pumps 30 may be used within a single fluid injection system 12. In FIG. 2, the cart 62 includes two tanks 26. In other embodiments, the fluid injection system 12 may includes multiple carts 62, each with one or more tanks 26. The pump 30 pumps anti-icing fluid and/or wash fluid from one or more of the tanks 26 on the cart 62 to the gas turbine engine 20 via the connecting hose 32. The connecting hose 32 may include multiple connections 64 coupled to multiple injectors 34, so that more than one location may receive anti-icing fluid. The connecting hose 32 may also include a valve 66. The valve 66 may control the flow of wash fluid through a first fluid flow path 67 and anti-icing fluid through a second fluid flow path 68. The first fluid flow path 67 may connect the valve to a separate fluid wash system included in a second cart 70. The fluid wash system with second cart 70 may include at least one fluid wash pump 72 and at least one wash fluid tank 74. The fluid wash tank 74 may contain water, detergent, or combination of water and detergent that may be used to clean off impurities that may reduce performance of the gas turbine engine 20. The valve 66 may be controlled by a controller to determine whether the connecting hose 32 conveys fluid from the fluid wash system 70 via the first fluid flow path 67, or the anti-icing system 62 via the second fluid flow path 68. The carts 62, 70 may ride with or be integrally built into the gas turbine power generation unit 10 on the trailer 16, or the carts 62, 70 may be transported separately or previously stationed at the designated mobile power station. This enables the power generation unit 10 to more cheaply and easily block and remove ice from the gas turbine intake 22 and the air intake system 14.

Figure 3:
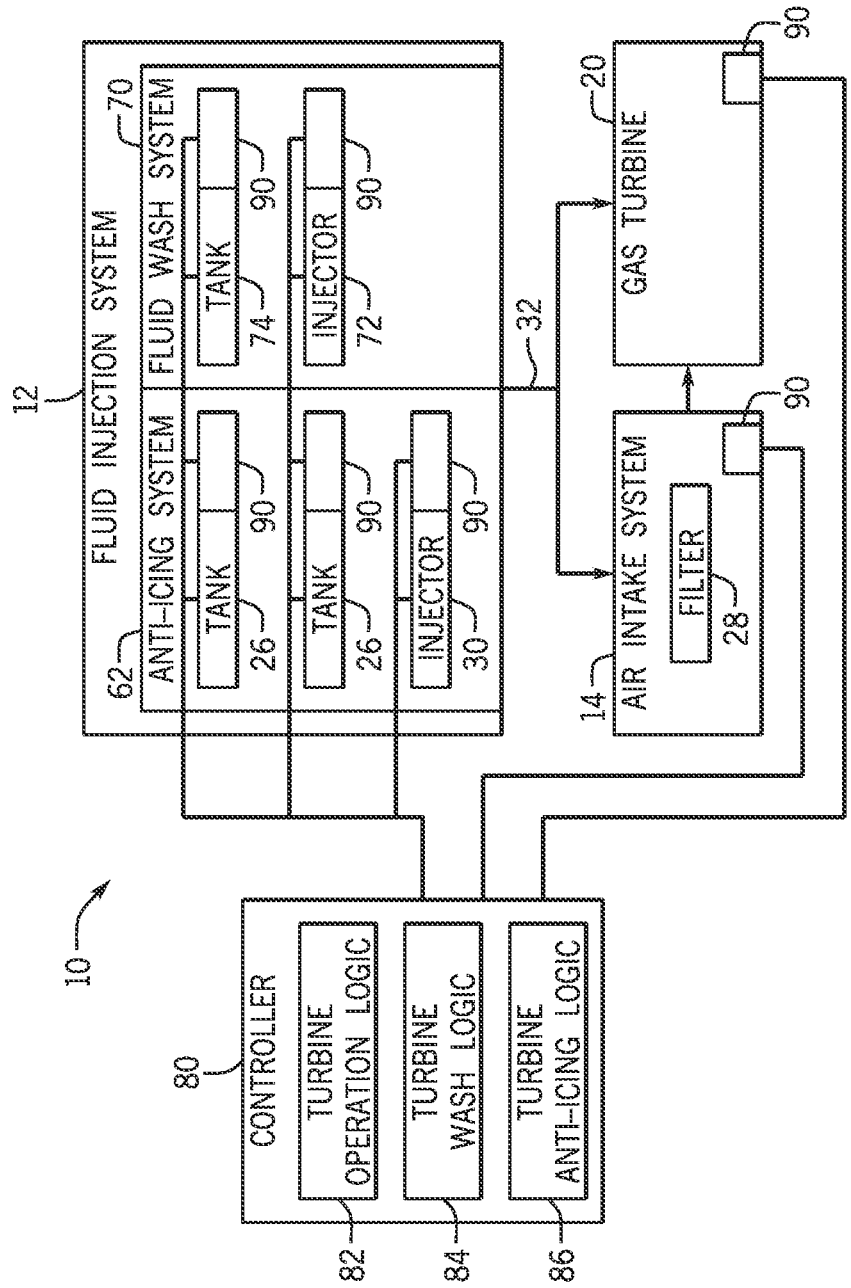
FIG. 3 is a schematic block diagram of an embodiment of the gas turbine generator with an fluid injection system and a controller.

FIG. 3 is a schematic block diagram of an embodiment of the gas turbine system 10 with the fluid injection system 12 and a controller 80. As mentioned above, the gas turbine system 10 may be stationary or mobile. The gas turbine system 10 is as generally described in FIG. 1 or FIG. 2. The gas turbine engine 20 receives filtered air from the air intake system 14 having one or more filters 28. The gas turbine engine 20 is configured to receive the air from the air intake system 14, compress the air, mix the air with fuel, combust the air-fuel mixture, drive one or more turbines, and output an exhaust flow. As mentioned above, the fluid injection system 12 includes one or more tanks 26, one or more connecting hoses 32, and one or more pumps 30. These components (i.e., tanks 26 and pumps 30) may be divided between a designated anti-icing system 62 and a designated fluid wash system 70. The anti-icing system 62, as explained above, is configured to store anti-icing fluid via the tanks 26 and deliver the anti-icing fluid to the intake system 14 and/or the gas turbine engine 20. Also mentioned above, the fluid wash system 70 includes the pump 72 and the tank 74.

The controller 80 includes logic (e.g., instructions stored on a non-transitory tangible computer readable medium) configured to control the operations of the gas turbine engine 20 and/or the fluid injection system 12. For example, the controller 80 includes a turbine operation logic 82 configured to control a startup procedure, normal operation procedure, and a shutdown procedure of the gas turbine engine 20. Also, the controller 80 includes a turbine wash logic 84 configured to control the fluid wash system 70. For example, the turbine wash logic 84 may be configured to activate the pump 72 to pump the wash fluid when a startup sequence (e.g., via the turbine operation logic 82) is activated. This may be done prior to ignition of the gas turbine engine 20. Further, the controller 80 includes a turbine anti-icing logic 86 configured to activate the pump 30 to spray anti-icing fluid into the air intake system 14, the gas turbine engine 20, or both.

The controller 80 includes sensors 90 for detecting various conditions throughout the fluid injection system 12 and the fluid wash system 70. For example, the tanks 26 may include sensors 90 such as cameras, thermometers, barometers, hygrometer, or others, to detect the amount of anti-icing fluid remaining therein. The fluid wash system 70 may also include similar sensors 90 to monitor the tanks 74. The sensors 90 may also be configured to detect the concentration of the anti-icing fluid or the fluid wash detergent. For example, the sensor 90 may be configured to detect whether the anti-icing fluid has 14 percent glycol or 21 percent glycol. Furthermore, the controller 80 may be able to monitor fluid injected from more than one tank such that the controller 80 may control the ratio of water to glycol being injected into the intake system 14 or the gas turbine 20. The sensors 90 may also be configured to monitor conditions and/or control the operation of the pumps 30, 72. The gas turbine 20 and the air intake system 14 also include sensors 90. The sensors 90 here may detect icing conditions, such as the temperature and relative humidity of the air that is flowing through. Generally, colder temperatures and higher relative humidity can increase icing (or susceptibility to ice formation) within the intake system 14 and the gas turbine 20. For example, ambient temperatures lower than approximately 5 degrees Celsius or relative humidity higher than approximately 60 percent is often a good indication that ice may potentially form within the air intake 14 or the gas turbine 20. Thus, the sensors 90 may detect such conditions and trigger the anti-icing logic 86 within the controller 80. The controller 80 may also be configured to respond to a combination of conditions that may indicate ice formation and/or predict possible future ice formation (i.e., inducive conditions) and may increase concentration for colder temperatures, or increase flow for colder temps, etc. The controller 80 may control the flow of the fluid to be injected in bursts or pulses (e.g., pulsating spray at some frequency that can be adjusted), or may inject the fluid continuously, or both. For example, the operating environment may include temperatures much lower than the lower ambient temperature of 5 degrees Celsius (e.g., 30 degrees, 20 degrees, or lower) which may trigger the anti-icing logic 86 even if the relative humidity is less than the higher relative humidity of 60 percent. The controller 80 may control the pumps 30, 72 so that they operate only when an icing condition (or ice inducive condition) has been detected by the controller 80. In other embodiments, the controller 80 may control the operation of the pumps 30, 72 based on a user directive.

The controller 80 may also be electrically connected to the gas turbine 20 and the air intake system 14 in order to monitor the operating conditions inside each of these components. The air intake system 14 may include sensors 90, which may be disposed throughout the plenum chamber 42 and the bellmouth 44. The sensors 90 also may be configured to monitor and/or detect ice buildup on the struts 46 and the IGVs 48. The controller 80 may cooperate with the fluid injection system 12 to monitor the air intake system 14 and the gas turbine 20 continuously while the gas turbine 20 is in operation, or periodically, or at a specific time. For example, the controller 80 may cooperate with the fluid injection system 12 to monitor the air intake system 14 and gas turbine 20 before or during startup, and then perform a fluid wash and/or anti-icing spray if monitored conditions suggest a need for cleaning or de-icing.

Technical effects of the disclosed embodiments include providing systems to block and remove the buildup of ice from within gas turbine engines 20. The fluid injection system 12 includes one or more connecting hoses 32 that operate to provide anti-icing fluid, such as monopropylene glycol, to areas that may be prone to ice buildup within the gas turbine engine 20 or the air intake system 14. In addition, the gas turbine power generation unit 10 may include a fluid wash system 70 that utilizes the same connecting hoses 32 in order to wash the gas turbine engine 20 or the air intake system 14. Further, the fluid injection system 12 includes the injectors 34 that direct the spray of the anti-icing fluid into areas of the gas turbine engine 20 and the air intake system 14 where it will be most useful. The fluid injection system 12 may make use of a controller 80 that includes turbine operation logic 82 (e.g., instructions stored on a non-transitory tangible computer readable medium) to control operation of the turbine engine 20 in conjunction with wash 84 and anti-icing 86 operations. These systems are designed to increase the efficiency of the gas turbine power generation unit 10, simplify and reduce the equipment needed to remove and block ice buildup to reduce initial unit cost, and to allow the use of the gas turbine power generation unit 10 in lower ambient temperature environments with higher relative humidity conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine system, comprising:
a turbine;
a combustor; and
a compressor having an air intake, wherein the air intake is configured to supply an air flow to the compressor;
a fluid injection system, comprising:
a fluid wash system comprising a wash logic configured to inject a wash fluid into the gas turbine system via the air intake, wherein the fluid wash system comprises an injector configured to inject the wash fluid into the gas turbine system; and
an anti-icing system comprising an anti-icing logic configured to inject an anti-icing fluid into the gas turbine system via the air intake, wherein the anti-icing system is configured to inject the anti-icing fluid into the gas turbine system via the injector;
a mobile power unit comprising the gas turbine system mounted on a mobile trailer and a portion of the fluid infection system mounted on the mobile trailer;
one or more sensors coupled to the gas turbine system and configured to monitor a plurality of parameters associated with condensate icing conditions within the gas turbine system; and
a controller coupled to the one or more sensors, wherein the controller is programmed to receive signals representative of the plurality of parameters from the one or more sensors, to determine a presence of condensate icing conditions within the gas turbine system during operation of the gas turbine system based on one or more parameters of the plurality of parameters, and to activate the anti-icing system to remove condensate ice within the gas turbine system during operation of the gas turbine system upon determining the presence of condensate icing conditions.

2. The system of claim 1, wherein the fluid wash system is configured to inject water, detergent, or any combination thereof, into the air intake of the gas turbine system.

3. The system of claim 1, wherein the anti-icing system is configured to inject glycol or a water-glycol mixture into the air intake of the gas turbine system.

4. The system of claim 1, comprising a controller configured programmed to control the fluid injection system.

5. The system of claim 4, comprising at least one valve controlled by the controller to selectively couple a first fluid flow path from the fluid wash system or a second fluid flow path from the anti-icing system to the air intake of the gas turbine system.

6. The system of claim 1, wherein the plurality of parameters comprise a temperature of the air flow being received into the air intake and a relative humidity, and wherein the controller is programmed to determine the presence of condensate icing conditions if the temperature of the air flow being received into the air intake is approximately 5° Celsius or less, the relative humidity is approximately 60 percent or more, or a combination thereof.

7. The system of claim 4, wherein the anti-icing system is configured to inject glycol or a water-glycol mixture into the air intake of the gas turbine system, and wherein the controller is programmed to control a ratio of glycol to water injected into the air intake of the gas turbine system.

8. A system, comprising:
a fluid injection system for a gas turbine system, comprising:
a fluid wash system comprising a wash logic configured to inject a wash fluid into the gas turbine system via an air intake of a compressor, wherein the fluid wash system comprises an injector configured to inject the wash fluid into the gas turbine system; and
an anti-icing system comprising an anti-icing logic configured to inject an anti icing fluid into the gas turbine system via the air intake, wherein the anti-icing system is configured to inject the anti-icing fluid into the gas turbine system via the injector;
a mobile power unit comprising the gas turbine system mounted on a mobile trailer and a portion of the fluid infection system mounted on the mobile trailer;
one or more sensors configured to couple to the gas turbine system and configured to monitor a plurality of parameters associated with condensate icing conditions within the gas turbine system; and a controller coupled to the one or more sensors, wherein the controller is programmed to receive signals representative of the plurality of parameters from the one or more sensors, to determine a presence of condensate icing conditions within the gas turbine system during operation of the gas turbine system based on one or more parameters of the plurality of parameters, and to activate the anti-icing system to remove condensate ice within the gas turbine system during operation of the gas turbine system upon determining the presence of condensate icing conditions.

9. The system of claim 8, wherein the fluid wash system is configured to inject water, detergent, or any combination thereof into the air intake of the gas turbine system.

10. The system of claim 8, wherein the anti-icing system is configured to inject glycol or a water-glycol mixture into the air intake of the gas turbine system.

11. The system of claim 8, wherein the anti-icing system comprises at least one tank disposed on a cart.

12. The system of claim 8, wherein the controller is programmed to control the fluid wash system.

13. The system of claim 12, wherein the fluid injection system comprises at least one valve controlled by the controller to couple a first fluid flow path from the fluid wash system or a second fluid flow path from the anti-icing system to the air intake of the gas turbine system.

14. The system of claim 12, wherein the plurality of parameters comprise a temperature of an air flow being received into the air intake and a relative humidity, and wherein the controller is programmed to determine the presence of condensate icing conditions if the temperature of the air flow being received into the air intake is approximately 5° Celsius or less, the relative humidity is approximately 60 percent or more, or a combination thereof.

15. The system of claim 12, wherein the anti-icing system is configured to inject glycol or a water-glycol mixture into the air intake of the gas turbine system, and wherein the controller is programmed to control a ratio of glycol to water injected into the air intake of the gas turbine system.

\* \* \* \* \*